United States Patent
Norsten et al.

(10) Patent No.: US 7,811,370 B2
(45) Date of Patent: Oct. 12, 2010

(54) PHASE CHANGE INK COMPOSITIONS

(75) Inventors: Tyler B. Norsten, Oakville (CA);
Caroline M. Turek, Hamilton (CA);
Stephan Drappel, Mississauga (CA);
Kathy De Jong, Oakville (CA)

(73) Assignee: Xerox Corporation, Norwalk, CT (US)

( * ) Notice: Subject to any disclaimer, the term of this patent is extended or adjusted under 35 U.S.C. 154(b) by 545 days.

(21) Appl. No.: 11/789,348

(22) Filed: Apr. 24, 2007

(65) Prior Publication Data

US 2008/0264288 A1    Oct. 30, 2008

(51) Int. Cl.
C09D 11/00    (2006.01)

(52) U.S. Cl. ............ 106/31.61; 106/31.29; 106/31.3; 106/31.62; 347/88; 347/99

(58) Field of Classification Search ......... 347/88, 347/99; 106/31.61, 31.77, 31.29
See application file for complete search history.

(56) References Cited

U.S. PATENT DOCUMENTS

| | | | |
|---|---|---|---|
| 3,653,932 A | 4/1972 | Berry et al. | 106/31.29 |
| 4,390,369 A | 6/1983 | Merritt et al. | 106/31.3 |
| 4,484,948 A | 11/1984 | Merritt et al. | 106/31.3 |
| 4,684,956 A | 8/1987 | Ball | 347/88 |
| 4,851,045 A | 7/1989 | Taniguchi | 106/31.31 |
| 4,889,560 A | 12/1989 | Jaeger et al. | 106/31.29 |
| 4,889,761 A | 12/1989 | Titterington et al. | 428/32.1 |
| 5,006,170 A | 4/1991 | Schwarz et al. | 106/31.3 |
| 5,122,187 A | 6/1992 | Schwarz et al. | 106/31.29 |
| 5,151,120 A | 9/1992 | You et al. | 106/31.29 |
| 5,195,430 A | 3/1993 | Rise | 100/168 |
| 5,221,335 A | 6/1993 | Williams et al. | 524/560 |
| 5,372,852 A | 12/1994 | Titterington et al. | 427/288 |
| 5,389,958 A | 2/1995 | Bui et al. | 347/103 |
| 5,496,879 A | 3/1996 | Griebel et al. | 524/320 |
| 5,621,022 A | 4/1997 | Jaeger et al. | 523/161 |
| 6,320,018 B1 | 11/2001 | Sijbesma et al. | 528/310 |
| 6,506,536 B2 | 1/2003 | Pappas et al. | 430/270.1 |
| 6,761,758 B2 | 7/2004 | Boils-Boissier et al. | 106/31.29 |
| 6,803,447 B2 | 10/2004 | Janssen et al. | 528/423 |
| 6,811,595 B2 | 11/2004 | Boils-Boissier et al. | 106/31.29 |
| 6,835,833 B2 | 12/2004 | Boils-Boissier et al. | 544/197 |
| 6,860,928 B2 | 3/2005 | Breton et al. | 106/31.29 |
| 6,872,243 B2 | 3/2005 | Breton et al. | 106/31.29 |
| 6,899,992 B2 | 5/2005 | Huang et al. | 430/270.1 |
| 6,906,118 B2 | 6/2005 | Goodbrand et al. | 523/160 |
| 6,946,025 B2 * | 9/2005 | Wu et al. | 106/31.29 |
| 6,972,304 B2 | 12/2005 | Smith et al. | 523/160 |
| 7,087,752 B2 | 8/2006 | Breton et al. | 544/197 |
| 7,157,601 B2 | 1/2007 | Breton et al. | 564/48 |
| 2003/0079644 A1 | 5/2003 | Smith et al. | 106/31.43 |
| 2003/0105185 A1 * | 6/2003 | Goodbrand et al. | 523/160 |
| 2003/0209166 A1 | 11/2003 | Vanmaele et al. | 106/31.27 |
| 2004/0060474 A1 | 4/2004 | Boils-boissier et al. | 544/296 |
| 2004/0065227 A1 | 4/2004 | Breton et al. | 106/31.43 |
| 2005/0051052 A1 | 3/2005 | Vanmaele et al. | 540/125 |

FOREIGN PATENT DOCUMENTS

| | | |
|---|---|---|
| EP | 0187352 | 7/1986 |
| EP | 0206286 | 12/1986 |
| WO | WO 94/04619 | 3/1994 |
| WO | WO 2005042641 | 5/2005 |
| WO | WO 2006006855 | 1/2006 |

OTHER PUBLICATIONS

English Abstract for German Patent Publication DE 4205636AL, Aug. 1993.
U.S. Patent Application filed Sep. 2, 2002, of Marcel P. Breton et al., Application Document No. 20040075723, entitled "Alkylated urea and triaminotriazine compounds and phase change inks containing same" U.S. Appl. No. 10/235,109, Published Apr. 22, 2004.
U.S. Patent Application filed Mar. 26, 2004, of Marcel P. Breton et al., Application Document No. 20040249210, entitled "Alkylated urea and triaminotriazine compounds and phase change inks containing same" U.S. Appl. No. 10/810,370, Published Dec. 9, 2004.
"Supramolecular Polymer Materials: Chain Extension of Telechelic Polymers Using a Reactive Hydrogen-Bonding Synthon," Brigitte J. B. Folmer, et al., Adv. Mater. 2000, pp. 874-878.
English Abstract for German Patent Publication DE 4205636AL, Aug. 1993.
U.S. Patent Application filed May 12, 2005, of Luc VanMaele et al., Application Document No. 20050051052, entitled "Self-assembling dyes" U.S. Appl. No. 10/844,099, Published Mar. 10, 2005.
U.S. Patent Application filed May 12, 2005, of Luc VanMaele et al., Application Document No. 20040206270, entitled "Ink composition containing a particular type of dye, and corresponding ink-jet printing process" U.S. Appl. No. 10/844,144, Published Oct. 21, 2004.

(Continued)

Primary Examiner—Matthew Luu
Assistant Examiner—Rut Patel
(74) Attorney, Agent, or Firm—Marylou J. Lavole, Esq. LLC

(57) ABSTRACT

Disclosed is a phase change ink composition comprising a colorant and a phase change ink vehicle comprising a compound of the formula

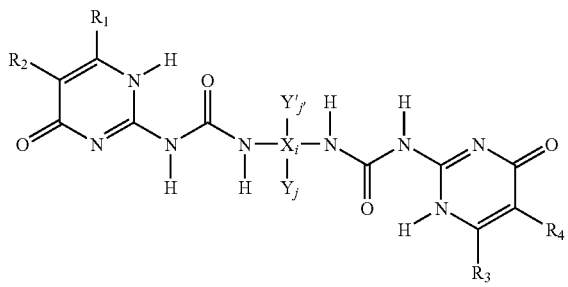

wherein $R_1$, $R_2$, $R_3$, $R_4$, $X_i$, $Y_j$, and $Y'_j$ are as defined herein.

24 Claims, No Drawings

OTHER PUBLICATIONS

U.S. Patent Application filed Oct. 30, 2006, of Tyler B. Norsten et al., entitled "Phase Change Ink Containing Amphiphilic Molecule" U.S. Appl. No. 11/554,410, not yet published.

"Reversible Polymers Formed From Self-Cmplementary Monomers Using Quadruple Hydrogen Bonding," Rint P. Sijbsema et al., Science, vol. 278, p. 1601 (1997).

"Conformationally restrained ceramide analogues: effects of lipophilic modifications on the antiproliferative activity," Marco Macchia et al., IL Framaco, 58 (2003), pp. 85-89.

English Abstract for German Patent Publication DE 4205636AL, Aug. 1993.

U.S. Patent Application filed Jun. 9, 2005, of Anton Willem Bosman et al., Application Document No. 20060018856, entitled "Siloxane polymers with quadruple hydrogen bonding units" U.S. Appl. No. 11/148,552, Published Jan. 26, 2006.

"Nanomechanical properties of polymers determined from nanoindentation experiments," C. Klapperich et al., ASME J. Tribology., vol. 123, Jul. 2001, pp. 624-631.

"Facile Synthesis of β-Keto Esters from Methyl Acetoacetate and Acid Chloride: The Barium Oxide/Methanol System," Yoshifumi Yuasa et al., Organic Process Research and Development, vol. 2, No. 6, 1998, pp. 412-414.

"Photoinitiated Cationic Polymerization of Epoxy Alcohol Monomers," James V. Crivello et al., J. of Polymer Science, vol. 38, 2000, pp. 389-401.

"Supramolecular Polymers from Linear Telechelic Siloxanes with Quadruple-Hydrogen-Bonded Units," J.H.K. KY Hirschberg, et al., Macromolecules, vol. 32, No. 8, 1999, pp. 2696-2705.

"3-Hydroxy-2-alkyl Carboxylic Acids Related to Mycolic Acid," Walter J. Gensler et al., Tetrahedron, vol. 35, 1979, pp. 2595-2600.

European Search Report, European Patent Application No. EP 08102204.8—2102, dated Jul. 30, 2008, 5 pages.

* cited by examiner

PHASE CHANGE INK COMPOSITIONS

BACKGROUND

The present disclosure is generally related to phase change inks. More specifically, the present disclosure is directed to hot melt or phase change inks suitable for use in ink jet printing processes including piezoelectric ink jet printing processes, acoustic ink jet printing processes, and the like. One embodiment of the present disclosure is directed to a phase change ink composition comprising a colorant and an ink vehicle, the ink vehicle comprising a compound of the formula

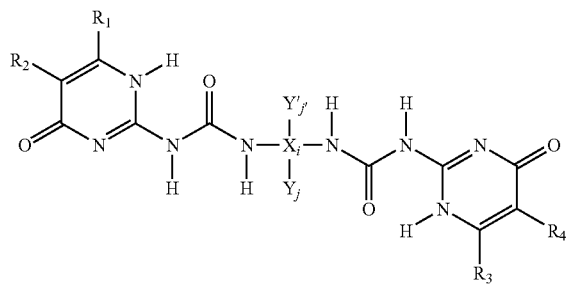

wherein $R_1$, $R_2$, $R_3$ and $R_4$ are each independently selected from an alkyl group, including substituted alkyl groups, unsubstituted alkyl groups, linear alkyl groups, and branched alkyl groups, and wherein hetero atoms either may or may not be present in the alkyl group, the alkyl group having from about 1 to about 30 carbon atoms, an alkylaryl group, including substituted alkylaryl groups, unsubstituted alkylaryl groups, linear alkylaryl groups, and branched alkylaryl groups, and wherein hetero atoms either may or may not be present in the alkyl portion of the alkylaryl group or the aryl portion of the alkylaryl group, the alkylaryl group having from about 4 to about 30 carbon atoms, an arylalkyl group, including substituted arylalkyl, unsubstituted arylalkyl groups, linear arylalkyl groups, and branched arylalkyl groups, and wherein hetero atoms either may or may not be present in the aryl portion of the arylalkyl group or the alkyl portion of arylalkyl, the arylalkyl group having from about 4 to about 30 carbon atoms, or hydrogen, wherein $R_1$, $R_2$, $R_3$ and $R_4$ can be the same or different, provided that both $R_1$ and $R_2$ cannot both be hydrogen and $R_3$ and $R_4$ cannot both be hydrogen;

wherein X is selected from carbon, silicon, oxygen and nitrogen atoms, i is an integer between from about 3 to about 50, $Y_j$ and $Y'_{j'}$ are each independently selected from carbon, silicon, oxygen and hydrogen atoms, j is an integer between from about 1 to about 50, j' is an integer between from about 1 to about 50, and the ratio of $\Sigma X_i / \Sigma Y_j Y'_{j'}$ for all non-hydrogen atoms attached to X is from about 0.1 to about 1.5;

wherein in various embodiments said ink exhibits a melt temperature of about 35° C. to about 120° C., a complex viscosity of less than about 100 Poise at a jetting temperature of no more than about 140° C., a viscosity of from about 1 to about 10,000 Centipoise, or from about 2 to about 20 Centipoise, or from about 5 to about 14 Centipoise at a jetting temperature of no more than about 140° C., and exhibits a Modulus at 25° C. of greater than about 0.1 GPa, about 0.1 to no more than about 4 GPa.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,122,187, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include rosin esters, polyamides, dimer acid amides, fatty acid amides, epoxy resins, fluid paraffin waxes, fluid microcrystalline waxes, Fischer-Tropsch waxes, polyvinyl alcohol resins, polyols, cellulose esters, cellulose ethers, polyvinyl pyridine resins, fatty acids, fatty acid esters, polysulfonamides, benzoate esters, long chain alcohols, phthalate plasticizers, citrate plasticizers, maleate plasticizers, sulfones, polyvinyl pyrrolidinone copolymers, polyvinyl pyrrolidone/polyvinyl acetate copolymers, novalac resins, natural product waxes, mixtures of linear primary alcohols, and linear long chain amides, and mixtures of linear primary alcohols and fatty acid amides, and liquid crystalline materials.

Molecules capable of self-assembly through hydrogen bonding are known. For example, in "Reversible Polymers Formed from Self-Complementary Monomers Using Quadruple Hydrogen Bonding," R. P. Sijbesma et al., *Science*, Vol. 278, p. 1601 (1997), the disclosure of which is totally incorporated herein by reference, discloses the use of units of 2-ureido-4-pyrimidone that dimerize strongly in a self-complementary array of four cooperative hydrogen bonds as the associating end group in reversible self-assembling polymer systems. The unidirectional design of the binding sites prevent uncontrolled multidirectional association or gelation. Linear polymers and reversible networks were formed from monomers with two and three binding sites, respectively. The thermal and environmental control over lifetime and bond strength made many properties, such as viscosity, chain length, and composition, tunable in a way not accessible to traditional polymers. Hence, polymer networks with thermodynamically controlled architectures could be formed for use in, for example, coatings and hot melts, where a reversible, strongly temperature-dependent rheology is highly advantageous.

U.S. Pat. No. 6,320,018, entitled "Supramolecular Polymer," the disclosure of which is totally incorporated by reference herein, describes in the abstract thereof a polymer comprising monomeric units linked via 4H-bridges and bound within said polymer via a different bond. The bond via the H-bridges is much stronger than with known supramolecular polymers.

U.S. Pat. No. 6,906,118 entitled "Phase Change Ink Compositions," the disclosure of which is totally incorporated by reference herein, describes in the Abstract thereof a phase change ink composition comprising a phase change ink composition comprising a colorant and an ink vehicle, the ink being a solid at temperatures less than about 50° C. and exhibiting a viscosity of no more than about 20 centipoise at a jetting temperature of no more than about 160° C., wherein at a first temperature hydrogen bonds of sufficient strength exist between the ink vehicle molecules so that the ink vehicle forms hydrogen-bonded dimers, oligomers, or polymers, and wherein at a second temperature which is higher than the first temperature the hydrogen bonds between the ink vehicle molecules are sufficiently broken that fewer hydrogen-bonded dimers, oligomers, or polymers are present in the ink at the second temperature than are present in the ink at the first temperature, so that the viscosity of the ink at the second temperature is lower than the viscosity of the ink at the first temperature.

While known compositions and processes are suitable for their intended purposes, a need remains for phase change inks that are suitable for hot melt ink jet printing processes, such as hot melt piezoelectric ink jet processes and the like. In addition, a need remains for phase change inks that are suitable for hot melt acoustic ink jet printing processes. Further, a need remains for low melt temperature phase change inks having low viscosity values at the jetting temperature of a hot melt ink jet printer. Further, a need remains for a low melt temperature phase change ink that is adequately hard so as to not be easily scratched off the paper and appropriately flexible so as to not fracture when the paper is folded. Previously known materials described in U.S. Pat. No. 6,320,018 exhibit, during cooling, a gradual increase in viscosity and produce, after a few hours at room temperature, a brittle solid similar to typical thermoplastic polymers. While such materials are suitable for their intended purposes, there remains a need for a phase change ink composition capable of generating supramolecular polymers with controllable melt temperatures, viscosities, while maintaining an adequate elastic modulus based on the designed intrinsic molecular structure.

The appropriate components and process aspects of the each of the foregoing may be selected for the present disclosure in embodiments thereof.

SUMMARY

The present disclosure is directed to a phase change ink composition comprising a colorant and phase change ink vehicle comprising a compound of the formula

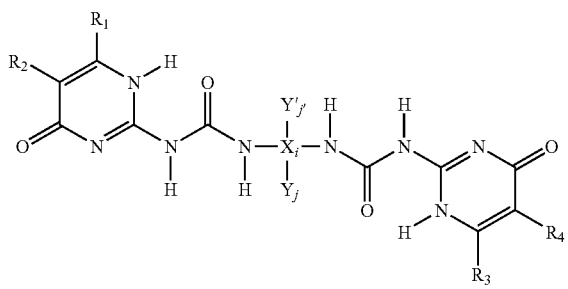

wherein $R_1$, $R_2$, $R_3$ and $R_4$ are each independently selected from an alkyl group, including substituted alkyl groups, unsubstituted alkyl groups, linear alkyl groups, and branched alkyl groups, and wherein hetero atoms such as oxygen, nitrogen, sulfur, silicon, phosphorus, boron, and the like either may or may not be present in the alkyl group, the alkyl group having in one embodiment from about 1 to about 30 carbon atoms, in another embodiment, from about 3 to about 18 carbon atoms, and in another embodiment from about 9 to about 15 carbon atoms, although the number of carbon atoms can be outside of these ranges, an alkylaryl group, including substituted alkylaryl groups, unsubstituted alkylaryl groups, linear alkylaryl groups, and branched alkylaryl groups, and wherein hetero atoms either may or may not be present in the alkyl portion of the alkylaryl group or the aryl portion of the alkylaryl group, the alkylaryl group having from about 4 to about 30 carbon atoms, in another embodiment, from about 6 to about 18 carbon atoms, and in another embodiment from about 9 to about 15 carbon atoms, although the number of carbon atoms can be outside of these ranges, an arylalkyl group, including substituted arylalkyl, unsubstituted arylalkyl groups, linear arylalkyl groups, and branched arylalkyl groups, and wherein hetero atoms either may or may not be present in the aryl portion of the arylalkyl group or the alkyl portion of arylalkyl, the arylalkyl group having from about 4 to about 30 carbon atoms, in another embodiment, from about 6 to about 18 carbon atoms, and in another embodiment from about 9 to about 15 carbon atoms, although the number of carbon atoms can be outside of these ranges, provided that at least one of $R_1$ and $R_2$, and at least one of $R_3$ and $R_4$ have at least about 1 carbon atom, wherein $R_1$, $R_2$, $R_3$ and $R_4$ can be the same or different, provided that both $R_1$ and $R_2$ cannot both be hydrogen and $R_3$ and $R_4$ cannot both be hydrogen;

wherein X is selected from carbon, silicon, oxygen and nitrogen atoms, i is an integer between 3 and 50, $Y_j$ and $Y'_{j'}$ are each independently selected from carbon, silicon, oxygen and hydrogen atoms, j is an integer between from about 1 to about 50, j' is an integer between from about 1 to about 50, and the ratio of $\Sigma X_i / \Sigma Y_j Y'_{j'}$ for all non-hydrogen atoms attached to X is from about 0.1 to about 1.5;

wherein in various embodiments said ink exhibits a melt temperature of about 35° C. to about 120° C., a complex viscosity of less than about 100 Poise at a jetting temperature of no more than about 140° C., a viscosity of from about 1 to about 10,000 Centipoise, or from about 2 to about 20 Centipoise, or from about 5 to about 14 Centipoise at a jetting temperature of no more than about 140° C., and exhibits a Modulus at 25° C. of greater than about 0.1 GPa, about 0.1 to no more than about 4 GPa.

DETAILED DESCRIPTION

The present disclosure is directed to phase change inks containing colorant compounds and phase change ink vehicles as disclosed herein. In embodiments, the present disclosure is directed to phase change inks containing colorant compounds a phase change ink vehicle comprising a compound of the formula

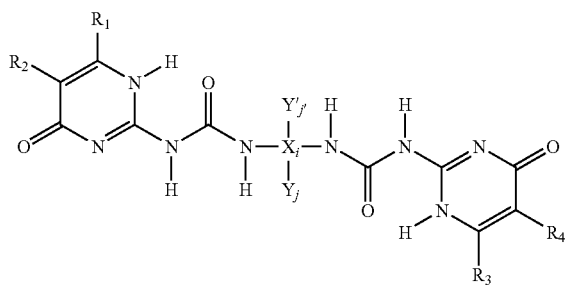

wherein $R_1$, $R_2$, $R_3$ and $R_4$ are each independently selected from an alkyl group, including substituted alkyl groups, unsubstituted alkyl groups, linear alkyl groups, and branched alkyl groups, and wherein hetero atoms either may or may not be present in the alkyl group, the alkyl group having from about 1 to about 30 carbon atoms, or about 3 to about 18 carbon atoms, or about 9 to about 15 carbon atoms, or hydrogen, wherein $R_1$, $R_2$, $R_3$ and $R_4$ can be the same or different, provided that both $R_1$ and $R_2$ cannot both be hydrogen and $R_3$ and $R_4$ cannot both be hydrogen.

In embodiments, $R_1$ is hydrogen and $R_2$ is an alkyl group, including substituted alkyl groups, unsubstituted alkyl groups, linear alkyl groups, and branched alkyl groups, and wherein hetero atoms either may or may not be present in the alkyl group, the alkyl group having from about 1 to about 30 carbon atoms, or about 3 to about 22 carbon atoms, or about 3 to about 18 carbon atoms, or about 9 to about 15 carbon atoms.

In embodiments, $R_3$ is hydrogen and $R_4$ is an alkyl group, including substituted alkyl groups, unsubstituted alkyl groups, linear alkyl groups, and branched alkyl groups, and wherein hetero atoms either may or may not be present in the alkyl group, the alkyl group having from about 1 to about 30 carbon atoms, or about 3 to about 18 carbon atoms, or about 9 to about 15 carbon atoms.

In further embodiments, $R_1$ and $R_3$ are hydrogen and $R_2$ and $R_4$ are each an alkyl group, including substituted alkyl groups, unsubstituted alkyl groups, linear alkyl groups, and branched alkyl groups, and wherein hetero atoms either may or may not be present in the alkyl group, the alkyl group having from about 1 to about 30 carbon atoms, or about 3 to about 18 carbon atoms, or about 9 to about 15 carbon atoms.

In still further embodiments, $R_1$, $R_2$, $R_3$ and $R_4$ are each an alkyl group, including substituted alkyl groups, unsubstituted alkyl groups, linear alkyl groups, and branched alkyl groups, and wherein hetero atoms either may or may not be present in the alkyl group, the alkyl group having from about 1 to about 30 carbon atoms or about 3 to about 18 carbon atoms, or about 9 to about 15 carbon atoms.

X is selected from carbon, silicon, oxygen and nitrogen atoms, or a combination thereof, in embodiments X is composed entirely of carbon atoms, i is an integer between from about 3 to about 50, Y is selected from carbon, silicon, oxygen and hydrogen atoms, in embodiments Y is composed entirely of carbon atoms, j is an integer between from about 1 to about 50, Y' is selected from carbon, silicon, oxygen and hydrogen atoms, in embodiments Y' is composed entirely of carbon atoms, j' is an integer between from about 1 to about 50, and in embodiments the ratio of $\Sigma X_i / \Sigma Y_j Y'_{j'}$ for all non hydrogen atoms attached to X is between from about 0.1 to about 1.5. In embodiments, the present selection of substituents provides a degree of branching in the divalent linking group X sufficient to provide low melt materials and to produce relatively hard yet appropriately flexible materials. In embodiments, X is a branched diisocyanate or a branched diisocyanate derivative.

Some specific examples of suitable X groups include (but are not limited to) the following, 1,4-diisocyanato-4-methylpentane, 1,6-diisocyanato-2,2,4-trimethylhexane, 1,6-diisocyanato-2,4,4-trimethylhexane, 1,5-diisocyanato-5-methylhexane, 3(4)-isocyanatomethyl-1-methylcyclohexyl isocyanate, 1,6-diisocyanato-6-methyl-heptane, 1,5-diisocyanato-2,2,5-trimethylhexane, 1,7-diisocyanato-3,7-dimethyloctane, 1-isocyanato-1-methyl-4-(4-isocyanatobut-2-yl)-cyclohexane, 1-isocyanato-1,2,2-trimethyl-3-(2-isocyanatoethyl)-cyclopentane, 1-isocyanato-1-4-dimethyl-4-isocyanatomethyl-cyclohexane, 1-isocyanato-1,3-dimethyl-3-isocyanatomethyl-cyclohexane, 1-isocyanato-n-butyl-3-(4-isocyanatobut-1-yl)-cyclopentane, 1-isocyanato-1,2-dimethyl-3-ethyl-3-isocyanatomethyl-cyclopentane, 3(4)-isocyanatomethyl-1-methylcyclohexyl isocyanate, toluene diisocyanate, methylene diphenyl diisocyanate, methylene dicyclohexane 4,4-diisocyanate, isophorone diisocyanate, diamer diisocyanate (CAS#68239065) and mixtures and combinations thereof.

Supramolecular chemistry (that is, the chemistry of non-covalent bonding interactions between molecules) is an active area with emerging applications. For example, Meijer and coworkers described a system whereby small molecules can be made to behave like and take on the properties of polymers (that is, strong and plastic-like) by employing the use of multi-point (quadruple) directional hydrogen bonding interactions.

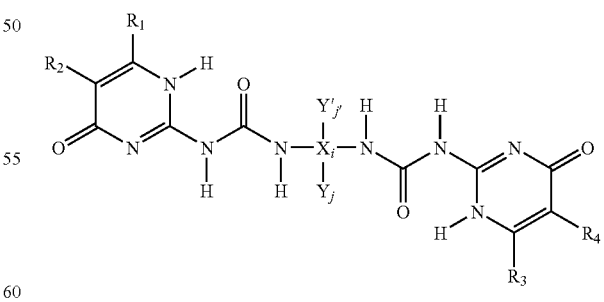

These materials have advantages over conventional polymers because the viscosities in these hydrogen bonding materials can be much lower at melt temperature because the hydrogen bonds linking the non-covalent "polymer" together can be reversibly formed and broken resulting in materials with viscosities that are strongly temperature dependent. See, for example, U.S. Pat. No. 6,320,018, the disclosure of which is totally incorporated by reference herein, which describes in the abstract thereof a polymer comprising monomeric units linked via 4H-bridges and bound within said polymer via a different bond. The bond via the H-bridges is much stronger than with known supramolecular polymers. See, also, U.S. Pat. No. 6,906,118, the disclosure of which is totally incorporated by reference herein.

U.S. patent application of Tyler Norsten and Peter G. Odell, Ser. No. 11/554,410, Filed Oct. 30, 2006, entitled "Phase Change Ink Containing Amphiphilic Molecule," which is incorporated by reference herein in its entirety, describes hydrogen-bond containing heterocycles that are monovalent in nature, that is to say, each molecule contains only one hydrogen bond containing heterocycle.

The present selectively substituted phase change ink vehicles are useful for incorporation into a phase change ink to provide a low melt solid ink. In embodiments, the present phase change ink compositions provide increased ink cohesion through multi-point hydrogen bonding interactions as a result of the divalent bridging X moiety. In embodiments, the present phase change ink vehicles provide divalent X moieties bridging two hydrogen bond containing heterocycles. Other related materials are known (See, for example, Folmer, J. B. et al. Adv. Mater. 2000, 12, 874) that employ polymeric bridging X moieties where the number of bridging atoms is greater than 50, and typical greater than 100. In certain instances, low melt temperatures can be obtained; however, the viscosity simultaneously increases, as a result of the long polymeric linking X moiety, to above about 100 Poise at 120° C. In embodiments, the present phase change ink materials include a relatively short, short comprising in embodiments from about 3 to about 50 atoms, branched, divalent X moiety, in combination with selective substitution patterns for $R_1$, $R_2$, $R_3$, and $R_4$. In embodiments this set of design features provides low melt, in embodiments below about 120° C., and correspondingly low viscosities, in embodiments below about 100 Poise at 125° C. while providing cohesive solid ink materials. For example, in various embodiments the present phase change ink composition exhibits a melt temperature of about 35° C. to about 120° C., a complex viscosity of less than about 100 Poise at a jetting temperature of no more than about 140° C., a viscosity of from about 1 to about 10,000 Centipoise, or from about 2 to about 20 Centipoise, or from about 5 to about 14 Centipoise at a jetting temperature of no more than about 140° C., and exhibits a Modulus at 25° C. of greater than about 0.1 GPa, about 0.1 to no more than about 4 GPa.

In solid mechanics the level of stiffness of a material is known as the Young's modulus or elastic modulus. Polymers based on silicon rubber are not very hard and have relatively low elastic modulus (for example, about 0.1 GPa). Polymers based on polymethylmethacrylate (PMMA) are relatively hard and have a relatively high elastic modulus (for example, about 3.75 GPa). Polymers based on polyethylene (for example low density polyethylene, high density polyethylene and the like) have modulus values ranging from about 0.32 to about 1.33 (See, for example, Klapperich, C et al. ASME J. Tribology., 123, 624, the disclosure of which is totally incorporated by reference herein) and provide an adequate level of hardness and flexibility (modulus) for phase change inks. However the high molecular weight. PE polymers that have the modulus and hardness properties that would be ideally suited for phase change inks have viscosities that are much too high to be useful in phase change inks.

In embodiments, the present phase change ink compositions provide low viscosity materials, relative to traditional polymers, that provide increased ink hardness and similar to high molecular weight. PE while providing adequate flexibility, in embodiments, a Modulus of greater than about 0.1, or no less than from about 0.1 to no more than about 4 GPa at 25° C., or no less than from about 0.2 to no more than about 3 GPa at 25° C., or no less than from about 0.2 to no more than about 1 GPa at 25° C., to the ink which is believed to be as a result of the branched divalent bridging X moiety in combination with the substitution patterns of the $R_1$, $R_2$, $R_3$, and $R_4$ groups.

While not being limited to any particular theory, the present inventors have discovered that by selecting the components around a hydrogen bond-containing heterocycle, that is, by selecting constituents for $R_1$-$R_4$ comprising a long chain alkyl group having from about 1 to about 30 carbon atoms, in combination with selection of the X moiety as described herein, the melting point and viscosity of the phase change ink material can be lowered to values suitable for use in current phase change ink applications. In embodiments, the materials can be made to be increasingly more flexible (and therefore less easily marred).

In embodiments, the present disclosure provides hydrogen bond-containing molecules that can be melted in the operating regime of the solid ink printers.

The ink compositions of the present disclosure in one embodiment have melting points of no lower than about 35° C., in another embodiment of no lower than about 50° C., in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C., although the melting point can be outside of these ranges.

In embodiments, the present phase change ink exhibits a melt temperature of about 35° C. to about 120° and a viscosity of no more than about 30 to no less than about 2 Centipoise at a jetting temperature of no more than about 140° C.

Embodiments of the present disclosure include, for example, but are not limited to, phase change ink vehicle materials containing a compound of the formula

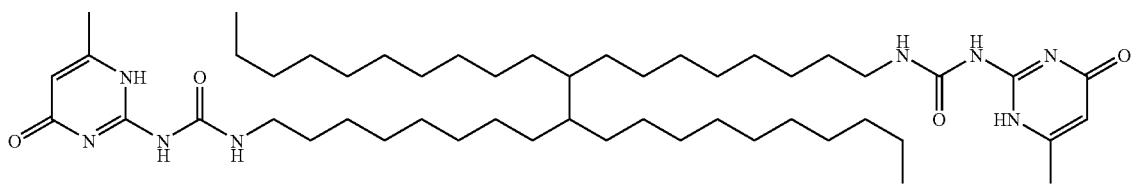

In another embodiment, phase change ink vehicle materials herein include, for example, a compound of the formula

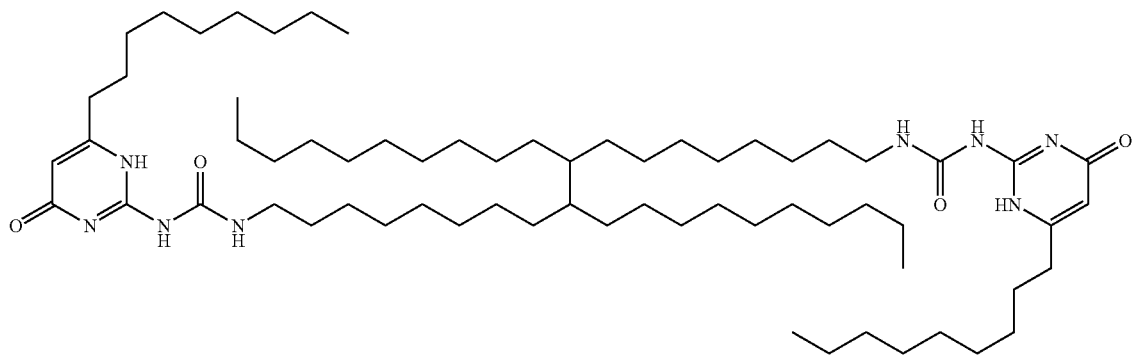

In another embodiment, phase change ink vehicle materials herein include, for example, a compound of the formula

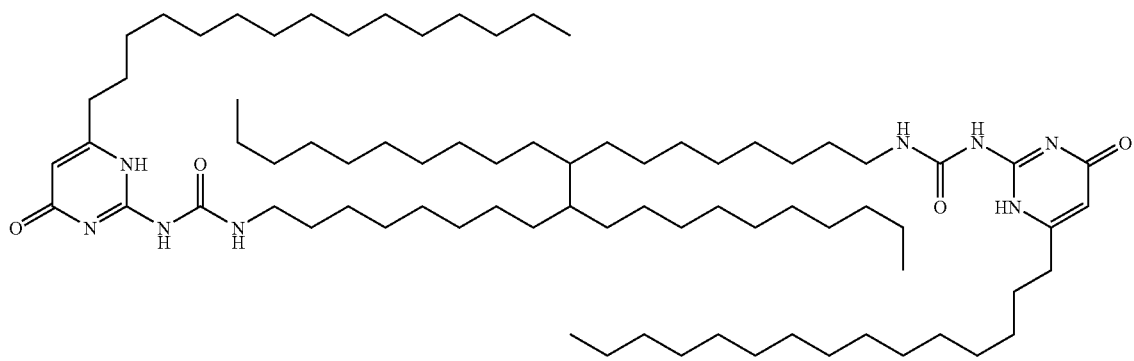

In another embodiment, phase change ink vehicle materials herein include, for example, a compound of the formula

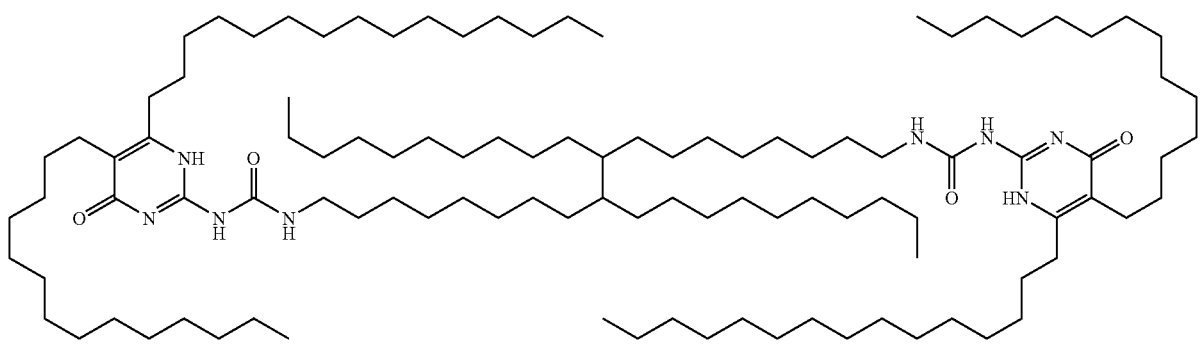

The various $R_1$, $R_2$, $R_3$ and $R_4$ groups can be placed on the pyrimidinone structure by any desired or suitable method. $R_1$ through $R_4$ substitutions can be accomplished, for example, as described in U.S. patent application of Tyler Norsten and Peter G. Odell, Ser. No. 11/554,410, Filed Oct. 30, 2006, entitled "Phase Change Ink Containing Amphiphilic Molecule," which is hereby incorporated by reference herein in its entirety, which application describes monovalent (rather than divalent as in the present disclosure) heterocycles.

The ink vehicle materials can be prepared by any desired or suitable method. For example, a selectively substituted amino pyrimidinone such as those described in Example 1, 3 or 5 (below) can be reacted with a selected divalent compound having isocyanate functional end groups For example, the following reaction scheme can be selected comprising reacting a diamer diisocyanate of the formula

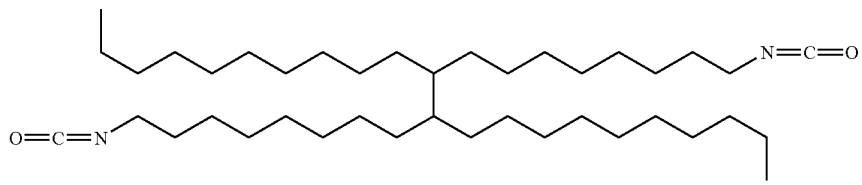

with an amino pyrimidinone compound of the formula

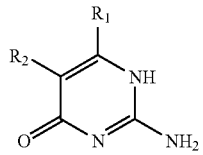

to provide a product of the formula

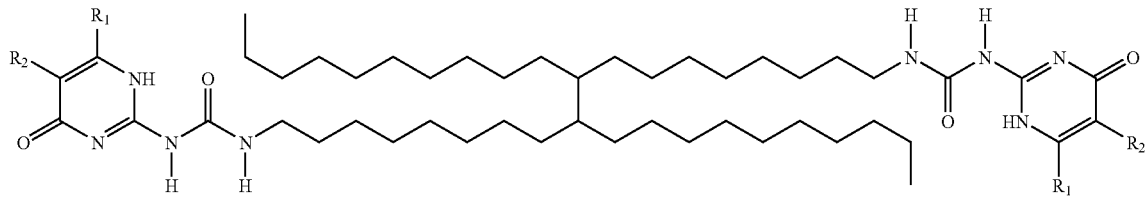

The ink compositions of the present disclosure can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20° C. to about 25° C.). The inks of the present disclosure are solid at ambient temperature. In a specific embodiment, during the formation process, the inks in their molten state are poured into molds and then allowed to cool and solidify to form ink sticks. In a specific embodiment the modulus of the solid ink at 25° C. is no less than 0.1 GPa and no more than 4 Gpa The ink vehicle material or mixture of ink vehicle materials is present in the ink in any desired or effective amount, typically at least about 25 percent by weight, or at least about 50 percent by weight, or at least about 75 percent by weight, or no more than about 98 percent by weight, although the amount can be outside of these ranges.

In embodiments, the ink vehicle material described herein functions as the sole ink vehicle for the ink composition. In other embodiments, other ink vehicles can be present in combination with the present ink vehicles.

For example wax additives may be added to the present ink vehicle, as used herein, the term wax includes, for example, natural, modified natural, synthetic waxes and compounded waxes.

Natural waxes may be of vegetable, animal, or mineral origin. Modified waxes are natural waxes that have been treated chemically to change their nature and properties. Synthetic waxes are made by the reaction or polymerization of chemicals. Compounded waxes are mixtures of various waxes or of waxes with resins or other compounds added thereto.

Suitable waxes can include paraffins, olefins such as polyethylene and polypropylene, microcrystalline waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers and mixtures thereof.

Suitable phase change waxes include hydroxyl-terminated polyethylene waxes such as mixtures of carbon chains with the structure $CH_3—(CH_2)_n—CH_2OH$, where there is a mixture of chain lengths, n, where the average chain length is in the range of about 16 to about 50, and linear low molecular weight polyethylene, of similar average chain length. Suitable examples of such waxes include, for example, UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite (Sand Springs, Okla.).

Other suitable phase change waxes include alcohol waxes, for example, hydrogenated castor oil, 1-octadecanol, 1,10-decanediol and 1,12-dodecanediol. Other examples of mono functional alcohols that can be employed as phase change waxes herein include 1-tetradecanol, 1-pentadecanol, 1-hexadecanol, 1-heptadecanol, 1-nonadecanol, 1-eicosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol. Also suitable are Guerbet alcohols such as 2-tetradecyl 1-octadecanol, 2-hexadecyl 1-eicosanol, 2-octadecyl 1-docosanol, 2-nonadecyl 1-tricosanol, 2-eicosyl tetracosanol, and mixtures thereof. Suitable diols include 18-octanediol, 1,9-nonanediol, 1,13-tridecanediol, 1,14-tetradecanediol, 1,15-pentadecanediol, 1,16-hexandecanediol, 1,17-heptadecanediol, 1,18-octadecanediol, 1,19-nonadecanediol, 1,20-eicosanediol, 1,22-docosanediol, 1,25-pentacosanediol, and mixtures thereof.

In embodiments, the phase change ink includes a urethane wax, an alcohol wax, an olefin wax, or a combination thereof.

Other suitable phase change waxes include carboxylic acid waxes, for example, UNACID® 350, UNACID® 425, UNACID® 550, UNACID® 700, with Mn approximately equal to 390, 475, 565 and 720 g/mol, respectively. All of these waxes are commercially available from Baker-Petrolite (Sand Springs, Okla.).

In other embodiments, the wax is a urethane wax. These compounds are the reaction product of an isocyanate and an alcohol.

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include n-octadecylisocyanate, hexadecylisocyanate; octylisocyanate; n- and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl) ethylisocyanates; and the like, as well as mixtures thereof. Examples of diisocyanates include isophorone diisocyanate (IPDI), toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethyl-1,6-diisocyanatohexane, tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Some specific examples of suitably functionalized alcohols include 1,4-butanediol vinyl ether, 1,4-cyclohexanedimethanol vinyl ether, ethylene glycol vinyl ether, di(ethylene glycol) vinyl ether, glycidol, 3-methyl-3-oxetanemethanol, glycerol diglycidyl ether, all of which are available from Sigma-Aldrich (Milwaukee, Wis.); 3,4-epoxycyclohexanemethanol, which can be prepared as described by Crivello and Liu (J. Polym. Sci. Part A: Polym. Chem. 2000, vol. 38, pp 389401); and the like.

Any desired or effective colorant can be employed in the inks of the present disclosure, including dyes, pigments, mixtures thereof, and the like, provided that the colorant can be dissolved or dispersed in the ink vehicle, with spirit soluble dyes being an example of suitable dyes. The colorant is present in the ink in any desired or effective amount to obtain the desired color and hue, typically no less than about 0.5 percent by weight of the ink, or no less than about 1 percent by weight of the ink, or no more than about 15 percent by weight of the ink, or no more than about 5 percent by weight of the ink, although the amount can be outside of these ranges.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich), Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G10 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell), Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D 1355, D 1351 (BASF); Hostaperm Pink E (American Hoechst); Fanal Pink D4830 (BASF); Cinquasia Magenta (Du Pont), Paliogen Black L0084 (BASF); Pigment Black K801 (BASF); and carbon blacks such as REGAL 3300 (Cabot), Carbon Black 5250, Carbon Black 5750 (Columbia Chemical), and the like.

When the ink vehicle material comprises a molecule with oligoalkylene oxide or polyalkylene oxide groups, water soluble dyes can be employed, such as anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131; 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, diazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical, Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical, Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc., D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF), Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Clariant Corp., Charlotte, N.C., such as Duasyn® Direct Black HEF-SF (Direct Black 168), Duasyn® Black RL-SF (Reactive Black 31), Duasyne® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct. Blue 199), Duasyn® Acid Blue AE-SF VP344 (Acid Blue 9), Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Sevron Blue 5GMF (ICI); various Reactive dyes, including Reactive Black dyes, Reactive Blue dyes, Reactive Red dyes, Reactive Yellow dyes, and the like, as well as mixtures thereof.

When the ink vehicle material comprises a molecule with large hydrocarbon groups or with oligosiloxane or polysiloxane groups, Solvent dyes can be employed, such as spirit soluble dyes and the like. Examples of suitable spirit solvent dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 (C.I. Solvent. Black, C.I. 12195) (BASF), Sudan Blue 670 (C.I. 61554) (BASF), Sudan Yellow 146 (C.I. 12700) (BASF), Sudan Red 462 (C.I. 26050) (BASF), and the like.

The inks of the present invention can optionally contain a conductivity enhancing agent when conductive inks are desirable, as in applications such as electric field assisted hot melt acoustic ink printing processes, particularly when the desired conductivity values are not obtained as a result of the other ink components, such as the colorant. Any desired or effective conductivity enhancing agent can be employed. Specific examples of suitable conductivity enhancing agents include complexes of dianilines, including dianiline and bis dianiline compounds, such as (1) 2,2'-dithio dianiline (Aldrich 16,676-6), (2) 4,4'-dithiodianiline (Aldrich 36,946-26), (3) 3,3'-methylene dianiline (Aldrich 37,826-7), (4) 4,4'-methylene dianiline (Aldrich 13,245-4), (5) N-methyl-4,4'-methylene dianiline (Aldrich 42,282-7), (6) 4,4'-methylene bis(2,6-diethyl aniline) (Aldrich 36,078-3), (7) 4,4'-methylene bis(2,6-diisopropyl-N,N-dimethylaniline) (Aldrich 40,353-9), (8) 4,4'-methylene bis(N,N-dimethylaniline) (Aldrich M4,445-1), (9) 4,4'-methylene bis(2,6-dimethylaniline) (Aldrich 36,079-1), (10) 4,4'-methylene bis(3-chloro-2,6-diethylaniline) (Aldrich 42,660-1), (11) 3,3'-(sulfonyl bis(4,1-phenylene))dianiline (Aldrich 44,095-7), (12) 4,4'-(1,3-phenylene diisopropylidene) bisaniline (Aldrich 45,048-0), and the like, as well as mixtures thereof, said dianilines being complexed with, for example, conductivity inducing phosphorous compounds such as phosphorus-containing acid compounds, with specific examples including (1) phenylphosphinic acid (Aldrich P2,880-8), (2) dimethylphosphinic acid (Aldrich 32,829-4), (3) methyl phosphonic acid (Aldrich 28,986-8), and the like, as well as mixtures thereof. Additional suitable conductivity enhancing agents include (1) (diethyl-(4-aminobenzyl) phosphonate (Aldrich 33,847-8), (2) diethyl-(phthalimidomethyl) phosphonate (Aldrich 36,622-6), (3) diethyl-(2,2,2-trifluoro-1-hydroxyethyl) phosphonate (Aldrich 43,982-7), (4) diphenyl succinimidyl phosphate (Aldrich 45,061-8), (5) dihexadecyl phosphate (Aldrich 27,149-7), (6) undecylenic acid zinc salt (hardness value 68; Aldrich 32,958-4), (7) zinc bis(2,2,6,6-tetramethyl-3,5-heptanedionate) (Aldrich 41,7734), (8) zinc cyclohexanebutyrate (Aldrich 22,841-9), (9) zinc stearate (Aldrich 30,756-4), (10) methyl-1-adamantane sulfonate (Aldrich 40,956-1), (11) octadecyl-4-chlorobenzene sulfonate (Aldrich 47,799-0), (12) tetrabutylammonium trifluoromethanesulfonate (Aldrich 34,509-1), (13) S,S'-ethylene-p-toluene thiosulfonate (Aldrich 23,257-2), (14) pyridinium-3-nitrobenzene sulfonate (Aldrich 27,198-5), (15) ρ-toluene sulfonyl chloride (Aldrich 24,087-7), (16) ρ-toluene sulfonyl chloride (Aldrich 15,971-9), (17) 1-(p-toluene sulfonyl) imidazole (Aldrich 24,424-4), (18) 1-(p-toluene sulfonyl)-3-nitro-1,2,4-triazole (Aldrich 24,417-1), (19) 2,4,6-triisopropyl benzene sulfonyl chloride (Aldrich 11,949-0), (20) 1-(2,4,6-triisopropyl benzene sulfonyl) imidazole (Aldrich 40,948-0), (21) 1-(2,4,6-triisopropyl benzene sulfonyl)-3-nitro-1,2,4-triazole (Aldrich 40,948-0), (22) 4-nitrobenzene sulfonyl chloride (Aldrich 27,224-8), and the like, as well as mixtures thereof. The conductivity enhancing agent, when present, is present in the ink in any desired or effective amount, typically at least about 0.25 percent by weight of the ink, preferably at least about 0.5 percent by weight of the ink, more preferably at least about 2 percent by weight of the ink, even more preferably at least about 8 percent by weight of the ink, and still more preferably at least about 13 percent by weight, and typically no more than about 50 percent by weight of the ink, preferably no more than about 45 percent by weight of the ink, more preferably no more than about 35 percent by weight of the ink, even more preferably no more than about 25 percent by weight of the ink, and still more preferably no more than about 20 percent by weight of the ink, although the amount can be outside of these ranges.

The inks of the present invention can also optionally contain an antioxidant. The optional antioxidants of the ink compositions protect the images from oxidation and also protect the ink components from oxidation during the heating portion of the ink preparation process. Specific examples of suitable antioxidants include (but are not limited to) (1) 2,6-di-tert-butyl-4-methoxyphenol (Aldrich 25,106-2), (2) 2,4-di-tert-butyl-6-(4-methoxybenzyl) phenol (Aldrich 23,008-1), (3) 4-bromo-2,6-dimethylphenol (Aldrich 34,951-8), (4) 4-bromo-3,5-didimethylphenol (Aldrich B6,420-2), (5) 4-bromo-2-nitrophenol (Aldrich 30,987-7), (6) 4-(diethyl aminomethyl)-2,5-dimethylphenol (Aldrich 14,668-4), (7) 3-dimethylaminophenol (Aldrich D14,400-2), (8) 2-amino-4-tert-amylphenol (Aldrich 41,258-9), (9) 2,6-bis(hydroxymethyl)-p-cresol (Aldrich 22,752-8), (10) 2,2'-methylenediphenol (Aldrich B4,680-8), (11) 5-diethylamino)-2-nitrosophenol (Aldrich 26,951-4), (12) antimony dialkyl phosphorodithioate (commercially available from Vanderbilt), (13) molybdenum oxysulfide dithiocarbamate (commercially available from Vanderbilt), (14) (nickel-bis(o-ethyl (3,5-di-tert-butyl-4-hydroxybenzyl) phosphonate (commercially available from Ciba Geigy), (15) 4,4'-methylene-bis(dibutyldithiocarbamate) (commercially available as Vanlube 7723 from Vanderbilt), (16) tetrasodium-N-(1,2-dicarboxyethyl)-N-octadecyl sulfosuccinamate (commercially available from American Cyanamid), (17) 2,6-di-tert-butyl-α-dimethylamino-4-cresol (commercially available as Ethanox-703 from Ethyl Corporation), (18) 2,2'-isobutylidene-bis (4,6-dimethyl phenol) (commercially available as Vulkanox NKF from Mobay Chemicals), (19) 2,2'-methylenebis(6-tert-butyl-4-methylphenol) (commercially available as Cyanox-2246, Aldrich 41,315-5), (20) 2,2'-methylenebis(6-tert-butyl-4-ethylphenol) (commercially available as Cyanox-425, Aldrich 41,314-3), (21) N-isopropyl-N'-phenyl-phenylene diamine (commercially available as Santoflex-IP from Monsanto Chemicals), (22) N-(1,3-dimethylbutyl)-N'-phenyl-phenylene-diamine (commercially available as Santoflex-13 from Monsanto Chemicals), (23) N,N'-di(2-octyl)-4-phenylene diamine (commercially available as Antozite-1 from Vanderbilt), (24) N,N'-bis(1,4-dimethylpentyl)-4-phenylene diamine (commercially available as Santoflex-77 from Monsanto Chemicals), (25) 2,4,6-tris-(N-1,4-dimethyl pentyl-4-phenylenediamino)-1,3,5-triazine (commercially available as Durazone-37 from Uniroyal), (26) D-raffinose pentahydrate (Aldrich 20,667-9), (27) 2,2'-methylene bis(6-tert-butyl-4-methyl-phenol) (Aldrich 41,313-5), (28) 2,6-di-tert-butyl-4-(dimethylaminomethyl) phenol (Aldrich 41,327-5), (29) 4-dodecylresorcinol (Aldrich D22,260-7), (30) Irganox 1010, and the like, as well as mixtures thereof. When present, the optional antioxidants are present in any desired or effective amount, typically at least about 0.001 percent by weight of the ink, and preferably at least about 0.01 percent by weight of the ink, and typically no more than about 1 percent by weight of the ink, preferably no more than about 0.5 percent by weight of the ink, and more preferably no more than about 0.25 percent by weight of the ink, although the amount can be outside of these ranges.

The inks of the present invention can also optionally contain a UV absorber. The optional UV absorbers in the inks of the present invention primarily protect the images generated therewith from UV degradation. Specific examples of suitable UV absorbers include (but are not limited to) (1) 2-amino-2',5-dichlorobenzophenone (Aldrich 10,515-5), (2) 2'amino-4',5'-dimethoxyacetophenone (Aldrich 32,922-3), (3) 2-benzyl-2-(dimethylamino)-4'-morpholino butyrophenone (Aldrich 40,564-7), (4) 4'-benzyloxy-2'-hydroxy-3'-methylacetophenone (Aldrich 29,884-0), (5) 4,4'-bis(diethylamino) benzophenone (Aldrich 16,032-6), (6) 5-chloro-2-hydroxy benzophenone (Aldrich C4,470-2), (7) 4'-piperazinoacetophenone (Aldrich 13,646-8), (8) 4'-piperidinoacetophenone (Aldrich 11,972-5), (9) 2-amino-5-chlorobenzophenone (Aldrich A4,556-4), (10) 2-bromo-2',4-dimethoxyacetophenone (Aldrich 19,948-6), (11) 2-bromo-2',5'-dimethoxyacetophenone (Aldrich 10,458-2), (12) 2-bromo-3'-nitroacetophenone (Aldrich 34,421-4), (13) 2-bromo-4'-nitroacetophenone (Aldrich 24,561-5), (14). 3',5'-diacetoxyacetophenone (Aldrich 11,738-2, (15) 2-phenylsulfonyl) acetophenone (Aldrich 34,150-3), (16) 3'-aminoacetophenone (Aldrich 13,935-1), (17) 4'-aminoacetophenone (Aldrich A3,800-2), (18) 1H-benzotriazole-1-acetonitrile (Aldrich 46,752-9), (19) 2-(2H-benzotriazol-2-yl)-4,6-di-tert-pentylphenol (Aldrich 42,274-6), (20) 1,1-(1, 2-ethane-diyl)bis(3,3,5,5-tetramethylpiperazinone) (commercially available from Goodrich Chemicals), (21) 2,2, 4-trimethyl-1,2-hydroquinoline (commercially available from Mobay Chemical), (22) 2-(4-benzoyl-3-hydroxy phenoxy)ethylacrylate, (23) 2-dodecyl-N-(1,2,2,6,6-pentamethyl-4-piperidinyl) succinimide (commercially available from Aldrich Chemical Co., Milwaukee, Wis.), (24) 2,2,6,6-tetramethyl-4-piperidinyl/β,β,β',β'-tetramethyl-3,9-(2,4,8, 10-tetraoxo spiro(5,5)-undecane) diethyl)-1,2,3,4-butane tetracarboxylate (commercially available from Fairmount), (25) N-ρ-ethoxycarbonylphenyl)-N'-ethyl-N'-phenylformadine (commercially available from Givaudan), (26) 6-ethoxy-1,2-dihydro-2,2,4-trimethylquinoline (commercially available from Monsanto Chemicals), (27) 2,4,6-tris-(N-1,4-dimethylpentyl-4-phenylenediamino)-1,3,5-triazine (commercially available from Uniroyal), (28) 2-dodecyl-N-(2,2,6,6-tetramethyl-4-piperidinyl) succinimide (commercially available from Aldrich Chemical Co.), (29) N-(1-acetyl-2,2,6,6-tetramethyl-4-piperidinyl)-2-dodecyl succinimide (commercially available from Aldrich Chemical Co.), (30) (1,2,2,6,6-pentamethyl-4-piperidinyl/β,ββ',β'-tetramethyl-3,9-(2,4,8, 10-tetraoxo-spiro-(5,5)undecane)diethyl)-1,2,3,4-butane tetracarboxylate (commercially available from Fairmount), (31) (2,2,6,6-tetramethyl-4-piperidinyl)-1,2,3,4-butane tetracarboxylate (commercially available from Fairmount), (32) nickel dibutyl dithio carbamate (commercially available as UV-Chek AM-105 from Ferro), and the like, as well as mixtures thereof. The optional UV absorber, when present, is present in the ink in any desired or effective amount, typically at least about 0.001 percent by weight of the ink, and preferably at least about 0.01 percent by weight of the ink, and typically no more than about 1 percent by weight of the ink, preferably no more than about 0.5 percent by weight of the ink, and more preferably no more than about 0.25 percent by weight of the ink, although the amount can be outside of these ranges.

Other optional additives to the inks include tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300 and NEVTAC® 80 (commercially available from Neville Chemical Company), WINGTACK® 86, a modified synthetic polyterpene resin (commercially available from Goodyear), and the like, in an amount typically of at least about 1 percent by weight of the ink, and preferably at least about 3 percent by weight of the ink, and typically no more than about 40 percent by weight of the ink, preferably no more than about 20 percent by weight of the ink, and more preferably no more than about 10 percent by weight of the ink, although the amount can be outside of this range, adhesives, such as VERSAMID® 757, 759, or 744 (commercially available from Henkel), in an amount typically of at least about 0.5 percent by weight of the ink, preferably at least about 5 percent by weight of the ink, and more preferably at least about 110 percent by weight of the ink, and typically no more, than about 50 percent by weight of the ink, preferably no more than about 40 percent by weight of the ink, and more preferably no more than about 20 percent by weight of the ink, although the amount can be outside of this range, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), KP-140®, a triphenyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount typically of at least about 0.5 and typically no more than about 20 percent by weight of the ink, and preferably no more than about 10 percent by weight of the ink, although the amount can be outside of this range, and the like.

The inks of the present disclosure can be employed in apparatus for direct printing ink jet processes and in indirect (offset) printing ink jet applications. Another embodiment of the present disclosure is directed to a process which comprises incorporating an ink of the present disclosure into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. In embodiments, the substrate is a final recording sheet and droplets of the melted ink are ejected in an imagewise pattern directly onto the final recording sheet. Yet another embodiment of the present disclosure is directed to a process which comprises incorporating an ink of the present disclosure into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. In embodiments, the intermediate transfer member is heated to a temperature above that of the final recording sheet and below that of the melted ink in the printing apparatus. Inks of the present disclosure can also be employed in other hot melt printing processes, such as hot melt acoustic ink jet printing, hot melt thermal ink jet printing, hot melt continuous stream or deflection ink jet printing, and the like. Phase change inks of the present disclosure can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

The following are illustrative of the procedures for making substituted amino pyrimidone molecules.

Example 1

Synthesis of 2-Amino-6-Methyl-4-Pyrimidone was prepared according to a literature method (Hirschberg, J. H. K., Beijer, F. H., van Aert, H. A., Magusin, P. C. M., Sijbesma, R. P., Meijer, E. W., Macromolecules, 1999, 32, 2696-2705, the disclosure of which is totally incorporated herein by reference). To a 1 liter round bottom flask under an inert argon atmosphere was added 650 milliliters of dry ethanol and 90.08 grams (0.5 mole) of guanidine carbonate. Thereafter, with good stirring was added dropwise over 2 hours 130.17 grams (1 mole) of ethyl acetoacetate, after which heat was applied and the mixture refluxed for 15 hours. The mixture was then cooled to room temperature and 800 milliliters of deionized water was slowly added to induce precipitation of the product. Subsequent vacuum filtration and washing with cold acetone secured the anticipated product in 68 percent yield (mp 311° C.). All physical properties were in accord with the reported properties.

To vary the substitution pattern at the 6 position of the heterocyclic ring in order to lower the melt temperature it is convenient to apply a recently reported literature procedure for the preparation of beta-keto esters (Yuasa, Y., Tsurata, H., Organic Process Research and Development, 1988, 2, 412-414, the disclosure of which is totally incorporated herein by reference). This procedure affords rapid access to a wide variety of variously 4-substituted alkyl acetates (the 4-substituent being derived from an acid chloride) which can be incorporated into the above-mentioned reaction to provide 2-amino-4 pyrimidones that have varying substitution patterns at their 6 positions.

Example 2

To 200 milliliters of toluene was added 37.8 grams (0.24 mol) of barium oxide. After addition of water (0.5 milliliter) and activation with vigorous stirring, methyl acetoacetate (92.9 grams, 0.8 mol) was added dropwise at 25 to 30° C. over a period of one hour. Into the solution was added dropwise hexadecanoyl chloride (54.9 grams, 0.2 mol) at the same temperature over a period of 1 hour and stirring was continued for an additional hour. Methanol (15 grams, 0.47 mol) was added to the reaction mixture, which was then stirred for 16 hours. The pH of the reaction mixture was adjusted to 1 with 5 percent sulfuric acid solution and the insoluble barium salt was filtered off. The organic filtrate was washed with 5 percent sodium bicarbonate followed by brine. Solvent was removed by rotary evaporation and the product, methyl 3-keto-octadecanoate, was secured as a low melting solid (54° C.) by vacuum distillation in 75 percent yield. In a completely analogous fashion was prepared methyl 3-keto-dodecanoate from decanoyl chloride.

Example 3

Substituting methyl 3-keto-octadecanoate for ethyl acetoacetate in Example 1 then afforded 2-amino-6-pentadecyl-4-pyrimidone. To vary the substitution pattern at the 5 and 6 positions of the heterocyclic ring in order to achieve even lower melt quadruple hydrogen bond containing materials, di-alkyl beta-keto esters can be synthesized according to (Farmaco, 2003, 58, pp 85-89 or Tetrahedron, 1979, 35, pp 2595-2600). This procedure affords access to a wide variety of variously 2,4-dialkyl substituted alkyl acetates (the 2-substituent being derived from an acid chloride in the Farmaco procedure or an alkyl halide in the Tetrahedron procedure) which can be incorporated into the above-mentioned reaction to provide 2-amino-4 pyrimidones that have varying substitution patterns at their 5 and 6 ring positions.

Example 4

Ethyl palmitate (10 grams, 0.035 mol) was treated with 19.2 mL of a 2M solution of lithium diisopropylamide (0.038 mol) in THF. The solution was stirred for 2 hours at ambient temperature. Into the solution was added dropwise hexadecanoyl chloride (9.9 grams, 0.038 mol) at the same temperature and stirring was continued for an additional hour. The solvent was removed by rotary evaporation and the product, ethyl 3-oxo-2-tridecyloctadecanoate was recrystallized from ethanol.

Example 5

Employing the product of Example 4 ethyl 3-oxo-2-tridecyloctadecanoate in the method of Example 1 then afforded 2-amino-5-tetradecyl-6-pentadecyl-4-pyrimidone.

Example 6

Comparative

In a 250 mL round-bottomed flask fitted with a reflux condenser was added 11,12-bis(8-isocyanatooctyl)docosane (diamer diisocyanate, Cognis Corp.) (11.74 g, 19.03 mmol) and 2-amino-6-methylpyrimidin-4(1H)-one (5 g, 40.0 mmol) in Pyridine (50 mL) to give a white suspension. The mixture was heated to 95 deg/C. under argon and stirred for 24 h. The pyridine was removed and the residue was taken up in chloroform. The hazy solution was filtered and the resulting clear solution was concentrated to about 100 ml and the viscous solution was poured into a rapidly stirring solution (1.5 L) of MeOH upon which a white solid formed. The white powder was collected by vacuum filtration and dried at 50 deg for 24 h to give 1,1'-(9,10-didecyloctadecane-1,18-diyl)bis(3-(6-methyl-4-oxo-1,4-dihydropyrimidin-2-yl)urea) (14.8 g)

Example 7

In a 250 mL round-bottomed flask was added 2-amino-6-nonylpyrimidin-4(1H)-one (1.88 g, 7.92 mmol) in Pyridine 50 mL to give a white suspension. The mixture was heated to 50 deg/C. 11,12-bis(8-isocyanatooctyl)docosane (2.327 g, 3.77 mmol) was dissolved in 5-10 mL of pyridine and added all at once to the mixture. The reaction was heated to 75 deg/C. and stirred for 24 h. The pyridine was removed and the residue was taken up in chloroform and the viscous solution was dripped into a rapidly stirring solution (500 mL) of MeOH upon which a white solid formed. The solution was decanted off and the residue was taken up in MeOH (10 ml) and rapidly stirred for 1 h. The product was collected by vacuum filtration dried under vacuum to give 4 g of 1,1'-(9,10-didecyloctadecane-1,18-diyl)bis(3-(6-nonyl-4-oxo-1,4-dihydropyrimidin-2-yl)urea).

Example 8

In a 250 mL round-bottomed flask fitted with a reflux condenser was added 11,12-bis(8-isocyanatooctyl)docosane (diamer diisocyanate, Cognis Corp.) (5.18 g, 8.39 mmol) and 2-amino-6-pentadecylpyrimidin-4(1H)-one (5.67 g, 17.63 mmol) in Pyridine (50 mL) to give a white suspension. The mixture was heated to 75 deg/C under argon and stirred for 24 h. The pyridine was removed and the residue was taken up in chloroform. The hazy solution was filtered and the resulting clear solution was concentrated to 50 ml and the viscous solution was poured into a rapidly stirring solution (1 L) of MeOH upon which a white solid formed. The solid was collected by filtration and dried under vacuum for 24 h to give 10.5 g 1,1'-(9,10-didecyloctadecane-1,18-diyl)bis(3-(4-oxo-6-pentadecyl-1,4-dihydropyrimidin-2-yl)urea)

Example 9

In a 100 mL round-bottomed flask was added 2-amino-5-pentadecyl-6-tetradecylpyrimidin-4(1H)-one (0.834 g, 1.610 mmol) in Pyridine 40 ml to give a white suspension. The mixture was heated to 50 deg/C. 11,12-bis(8-isocyanatooctyl)docosane (0.473 g, 0.767 mmol) was dissolved in 5 mL of pyridine and added all at once to the mixture. The reaction was heated to 75 deg/C. overnight. The pyridine was removed with a rotary evaporator. The product was purified by column chromatography through silica gel using 3% MeOH/CH2Cl2 to give 1 g of 1,1'-(9,10-didecyloctadecane-1,18-diyl)bis(3-(4-oxo-6-pentadecyl-5-tetradecyl-1,4-dihydropyrimidin-2-yl)urea).

Example 10

A black solid ink composition is prepared by mixing thirty grams of UNACID 550 and five grams of the product from Example 7, two grams of the antioxidant NAUGARD 524, and two grams of the colorant Savinyl Black RLS. The mixture is heated to a temperature of 140° C. and stirred at this temperature for a period of at least one hour to form a homogenous mixture. Thereafter the mixture is cooled to 25° C. to yield a black solid ink.

Example 11

A black solid ink composition is prepared by mixing twenty grams of UNACID 550 and twenty grams of the product from Example 8, two grams of the antioxidant NAUGARD 524, and two grams of the colorant Savinyl Black RLS. The mixture is heated to a temperature of 140° C. and stirred at this temperature for a period of at least one hour to form a homogenous mixture. Thereafter the mixture is cooled to 25° C. to yield a black solid ink.

Example 12

A black solid ink composition is prepared by mixing five grams of UNACID 550 and thirty five grams of the product from Example 9, two grams of the antioxidant NAUGARD 524, and two grams of the colorant Savinyl Black RLS. The mixture is heated to a temperature of 140° C. and stirred at this temperature for a period of at least one hour to form a homogenous mixture. Thereafter the mixture is cooled to 25° C. to yield a black solid ink.

The thermal properties (melt temperature) of the materials of Examples 6 through 9 were analyzed employing Differential Scanning Calorimetry (DSC). The samples were taken through a heat-cool-heat cycle at 10° C./min and the melt temperatures reported are from the apex of the endothermic melting transition of the second heat cycle.

TABLE 1

| Example # | Melt Temperature (° C.) |
| --- | --- |
| 6 | 106 |
| 7 | 54 |
| 8 | 63 |
| 9 | 40 |

Examples 6 through 9 were analyzed for complex viscosity on a Rheometerics RF53 fluids spectrometer in a cone-plate geometry (25 mm) and a nominal gap of 20 microns. The zero shear viscosity was measured as a function of temperature and viscosities at selected temperatures are shown in Table 2.

TABLE 2

| Example # | Complex Viscosity (Poise) at 125° C. | Complex Viscosity (Poise) at 65° C. |
| --- | --- | --- |
| 6 | 76.3 | 166000 |
| 7 | 18.3 | 3185 |
| 8 | 10.8 | 1678 |
| 9 | 8.9 | 474 |

The mechanical properties of Examples 6-9 were examined by nanoindentation experiments employing a Hysitron Triboindenter®. The reduced modulus of each example was determined from the unloading material response using the compliance method, whereas the hardness was calculated as a maximum contact load divided by the corresponding projected area, obtained from the known tip shape function as shown in Table 3. The experiments were performed at room temperature.

TABLE 3

| Example # | Modulus (GPa) | Hardness (GPa) |
| --- | --- | --- |
| 6 | 0.724 ± 0.021 | 0.044 ± 0.001 |
| 7 | 0.145 ± 0.006 | 0.015 ± 0.001 |
| 8 | 0.188 ± 0.003 | 0.020 ± 0.001 |
| 9 | 0.267 ± 0.015 | 0.018 ± 0.0013 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition comprising a colorant and an ink vehicle comprising a compound of the formula

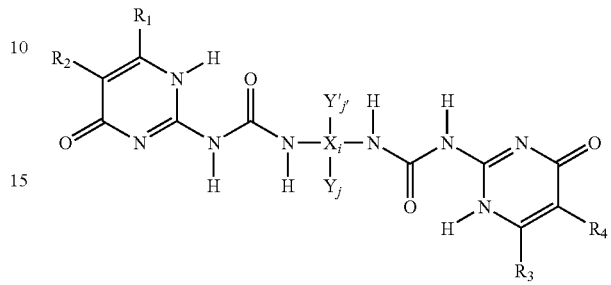

wherein $R_1$, $R_2$, $R_3$ and $R_4$ are each independently selected from an alkyl group, including substituted alkyl groups, unsubstituted alkyl groups, linear alkyl groups, and branched alkyl groups, and wherein hetero atoms either may or may not be present in the alkyl group, the alkyl group having from about 1 to about 30 carbon atoms, an alkylaryl group, including substituted alkylaryl groups, unsubstituted alkylaryl groups, linear alkylaryl groups, and branched alkylaryl groups, and wherein hetero atoms either may or may not be present in the alkyl portion of the alkylaryl group or the aryl portion of the alkylaryl group, the alkylaryl group having from about 4 to about 30 carbon atoms, an arylalkyl group, including substituted arylalkyl, unsubstituted arylalkyl groups, linear arylalkyl groups, and branched arylalkyl groups, and wherein hetero atoms either may or may not be present in the aryl portion of the arylalkyl group or the alkyl portion of arylalkyl, the arylalkyl group having from about 6 to about 30 carbon atoms, or hydrogen, wherein $R_1$, $R_2$, $R_3$ and $R_4$ can be the same or different, provided that both $R_1$ and $R_2$ cannot both be hydrogen and $R_3$ and $R_4$ cannot both be hydrogen;

wherein X is comprised of a diisocyanate or a diisocyanate derivative, i is an integer between from about 3 to about 50, Y and Y' are each independently selected from carbon, silicon, oxygen and hydrogen atoms, j is an integer between from about 1 to about 50, j' is an integer between from about 1 to about 50, and the ratio of $\Sigma X_i / \Sigma Y_j Y'_{j'}$, for all non hydrogen atoms attached to X is from about 0.1 to about 1.5;

wherein said ink simultaneously exhibits a melt temperature of about 35° C. to about 120° C., a complex viscosity of less than about 100 Poise at a jetting temperature of no more than about 140° C., and a Modulus of greater than about 0.1 GPa at about 25° C.

2. A phase change ink according to claim 1, further comprising a wax additive, wherein said ink exhibits a melt temperature of about 35° C. to about 120° C., a viscosity of from about 2 to about 20 Centipoise at a jetting temperature of no more than about 140° C., and a Modulus at 25° C. of no less than about 0.2 to no more than about 3 GPa.

3. A phase change ink according to claim 1, further comprising a wax additive, wherein said ink exhibits a melt temperature of about 35° C. to about 120° C., a viscosity of about 5 to about 14 Centipoise at a jetting temperature of no more than about 140° C., and a Modulus at 25° C. of no less than about 0.2 to no more than about 1 GPa.

4. A phase change ink composition according to claim 1, wherein $R_1$ is a linear alkyl group, $R_2$ is a linear alkyl group, or both $R_1$ and $R_2$ are linear alkyl groups and wherein $R_3$ is a linear alkyl group, $R_4$ is a linear alkyl group, or both $R_3$ and $R_4$ are linear alkyl groups.

5. A phase change ink composition according to claim 1, wherein $R_1$ is a branched alkyl group, $R_2$ is a branched alkyl group, or both $R_1$ and $R_2$ are branched alkyl groups and wherein $R_3$ is a branched alkyl group, $R_4$ is a branched alkyl group, or both $R_3$ and $R_4$ are branched alkyl groups.

6. A phase change ink composition according to claim 1, herein $R_1$ is a substituted alkyl group, $R_2$ is a substituted alkyl group, or both $R_1$ and $R_2$ are substituted alkyl groups and wherein $R_3$ is a substituted alkyl group, $R_4$ is a substituted alkyl group, or both $R_3$ and $R_4$ are substituted alkyl groups.

7. A phase change ink composition according to claim 1, wherein $R_1$ is an alkyl group and wherein hetero atoms selected from oxygen, nitrogen, sulfur, silicon, phosphorus, boron, or mixtures thereof, are present in the alkyl group, $R_2$ is an alkyl group and wherein hetero atoms selected from oxygen, nitrogen, sulfur, silicon, phosphorus, boron, or mixtures thereof, are present in the alkylene group, or wherein both $R_1$ and $R_2$ is an alkyl group and wherein hetero atoms selected from oxygen, nitrogen, sulfur, silicon, phosphorus, boron, or mixtures thereof are present in the alkyl group; and
  wherein $R_3$ is an alkyl group and wherein hetero atoms selected from oxygen, nitrogen, sulfur, silicon, phosphorus, boron, or mixtures thereof, are present in the alkyl group, $R_4$ is an alkyl group and wherein hetero atoms selected from oxygen, nitrogen, sulfur, silicon, phosphorus, boron, or mixtures thereof, are present in the alkylene group, or wherein both $R_3$ and $R_4$ is an alkyl group and wherein hetero atoms selected from oxygen, nitrogen, sulfur, silicon, phosphorus, boron, or mixtures thereof are present in the alkyl group.

8. A phase change ink composition according to claim 1, wherein $R_1$ comprises an alkyl group having from about 3 to about 22 carbon atoms, $R_2$ comprises an alkyl group having from about 3 to about 22 carbon atoms, or both $R_1$ and $R_2$ comprises an alkyl group having from about 3 to about 22 carbon atoms; and
  wherein $R_3$ comprises an alkyl group having from about 3 to about 22 carbon atoms, $R_4$ comprises an alkyl group having from about 3 to about 22 carbon atoms, or both $R_3$ and $R_4$ comprises an alkyl group having from about 3 to about 22 carbon atoms.

9. A phase change ink composition according to claim 1, wherein $R_1$ comprises an alkyl group having from about 3 to about 18 carbon atoms, $R_2$ comprises an alkyl group having from about 3 to about 18 carbon atoms, or both $R_1$ and $R_2$ comprises an alkyl group having from about 3 to about 18 carbon atoms; and
  wherein $R_3$ comprises an alkyl group having from about 3 to about 18 carbon atoms, $R_4$ comprises an alkyl group having from about 3 to about 18 carbon atoms, or both $R_3$ and $R_4$ comprises an alkyl group having from about 3 to about 18 carbon atoms.

10. A phase change ink composition according to claim 1, wherein $R_1$ comprises an alkyl group having from about 9 to about 15 carbon atoms, $R_2$ comprises an alkyl group having from about 9 to about 15 carbon atoms, or both $R_1$ and $R_2$ comprises an alkyl group having from about 9 to about 15 carbon atoms; and
  wherein $R_3$ comprises an alkyl group having from about 9 to about 15 carbon atoms, $R_4$ comprises an alkyl group having from about 9 to about 15 carbon atoms, or both $R_3$ and $R_4$ comprises an alkyl group having from about 9 to about 15 carbon atoms.

11. A phase change ink composition according to claim 1, wherein $R_1$ is an alkyl group and $R_2$ is hydrogen.

12. A phase change ink composition according to claim 1, wherein $R_3$ is an alkyl group and $R_4$ is hydrogen.

13. A phase change ink composition according to claim 1, wherein $R_1$ and $R_3$ are each an alkyl group and $R_2$ and $R_4$ are each hydrogen.

14. A phase change ink composition according to claim 1, wherein $R_1$, $R_2$, $R_3$ and $R_4$ are each an alkyl group.

15. A phase change ink composition according to claim 1, wherein X is selected from the group consisting of 1,4-diisocyanato-4-methyl-pentane, 1,6-diisocyanato-2,2,4-trimethylhexane, 1,6-diisocyanato-2,4,4-trimethylhexane, 1,5-diisocyanato-5-methylhexane, 3(4)-isocyanatomethyl-1-methylcyclohexyl isocyanate, 1,6-diisocyanato-6-methyl-heptane, 1,5-diisocyanato-2,2,5-trimethylhexane, 1,7-diisocyanato-3,7-dimethyloctane, 1-isocyanato-1-methyl-4-(4-isocyanatobut-2-yl)-cyclohexane, 1-isocyanato-1,2,2-trimethyl-3-(2-isocyanato-ethyl)-cyclopentane, 1-isocyanato-1-4-dimethyl-4-isocyanatomethyl-cyclohexane, 1-isocyanato-1,3-dimethyl-3-isocyanatomethyl-cyclohexane, 1-isocyanato-n-butyl-3-(4-isocyanatobut-1-yl)-cyclopentane, 1-isocyanato-1,2-dimethyl-3-ethyl-3-isocyanatomethyl-cyclopentane, 3(4)-isocyanatomethyl-1-methylcyclohexyl isocyanate, toluene diisocyanate, methylene diphenyl diisocyanate, methylene dicyclohexane 4,4-diisocyanate, isophorone diisocyanate, diamer diisocyanate, and mixtures and combinations thereof.

16. A phase change ink composition according to claim 1, wherein X is a compound of the formula

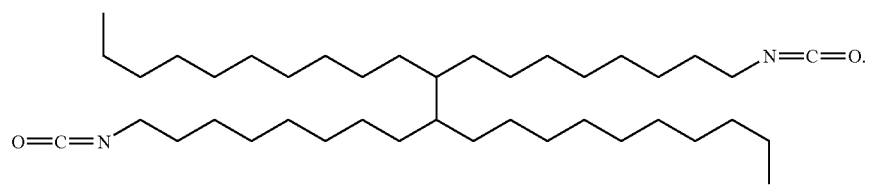

17. A phase change ink composition according to claim 1, wherein the phase change ink vehicle comprises a compound of the formula

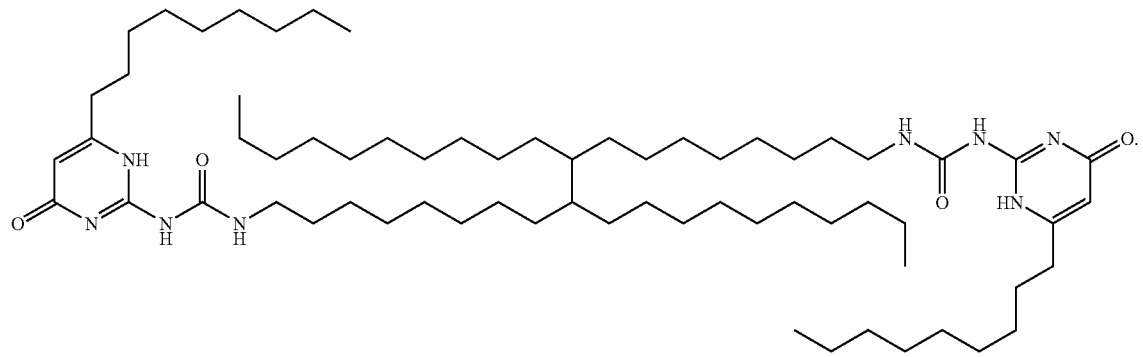

18. A phase change ink composition according to claim 1, wherein the phase change ink vehicle comprises a compound of the formula

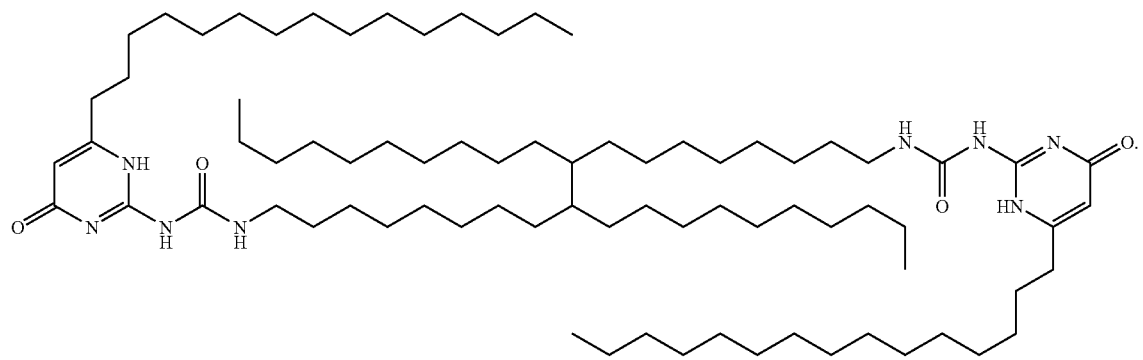

19. A phase change ink composition according to claim 1, wherein the phase change ink vehicle comprises a compound of the formula

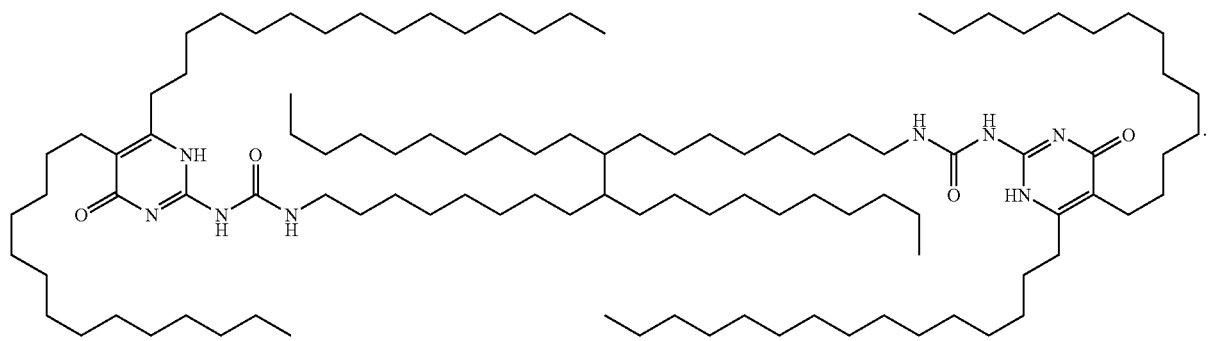

20. A process which comprises (1) incorporating into an ink jet printing apparatus the phase change ink composition of claim 1
  (2) melting the ink; and
  (3) causing droplets of the melted ink to be ejected in an imagewise pattern onto a substrate.

21. A process according to claim 20, wherein the printing apparatus employs a piezoelectric printing process wherein droplets of the ink are caused to be ejected in imagewise pattern by oscillations of piezoelectric vibrating elements.

22. A process according to claim 20, wherein the substrate is a final recording sheet and droplets of the melted ink are ejected in an imagewise pattern directly onto the final recording sheet.

23. A process according to claim 20, wherein the substrate is an intermediate transfer member and droplets of the melted ink are ejected in an imagewise pattern onto the intermediate transfer member followed by transfer of the imagewise pattern from the intermediate transfer member to a final recording sheet.

24. A process according to claim 20, wherein the intermediate transfer member is heated to a temperature above that of the final recording sheet and below that of the melted ink in the printing apparatus.

* * * * *